Patented July 18, 1933

1,919,002

UNITED STATES PATENT OFFICE

WILLIAM WHITEHEAD, OF CUMBERLAND, MARYLAND, ASSIGNOR TO CELANESE CORPORATION OF AMERICA, A CORPORATION OF DELAWARE

PURIFICATION OF CELLULOSE ESTERS

No Drawing.   Application filed October 2, 1929.  Serial No. 396,937.

This invention relates to the purification of organic esters of cellulose and relates more particularly to the removal or extraction therefrom of certain constituents that tend to decrease the clarity and brilliancy of solutions, films or yarns made therefrom.

An object of my invention is to prepare organic esters of cellulose, such as cellulose acetate, of high clarity characteristics. A further object of my invention is to extract from cellulose acetate certain constituents that do not have the same solubility characteristics as the main portion thereof, whereby solutions of the cellulose acetate may be formed in solvents for the main constituents, which solutions are comparatively free of undissolved matter so that such solutions contain less material that must be removed by filtration. Other objects of my invention will appear from the following detailed description.

While this invention relates to the treatment of organic esters of cellulose broadly, such as cellulose formate, cellulose propionate and cellulose butyrate, it is particularly applicable to the treatment of cellulose acetate, and this invention will be specifically described with reference to cellulose acetate.

Cellulose acetate is ordinarily prepared by the acetylation of cellulose, and the subsequent partial hydrolysis of the cellulose acetate formed in the acetylation to a cellulose acetate of lower acetyl value by a process known as ripening, in order to develop the desired solubility characteristics. Cellulose acetate thus prepared contains constituents or bodies of doubtful chemical constitution which are not soluble or readily soluble in solvents or solvent mixtures that are employed for the same. Thus an acetone soluble cellulose acetate prepared in this manner, when dissolved in acetone or mixtures of acetone and water or acetone and ethyl alcohol, forms a solution that contains these bodies dispersed but not entirely dissolved therein.

The presence of these insoluble constituents is objectionable in that they are difficult to remove and make necessary the repeated filtrations of the solution of cellulose acetate. These insoluble constituents reduce the clarity and brilliancy of solutions of the cellulose acetate and of films, yarns, sheets and other products made therefrom. The presence of these insoluble constituents causes interruptions in processes involving the forcing of solutions of cellulose acetate through fine orifices, such as in the spinning of filaments or yarns, since they tend to clog the orifices. Finally, solutions which have been prepared from such cellulose acetate and which have been apparently freed of these insoluble constituents by filtration, become cloudy on standing, probably because of coalescence of the very small particles of such insoluble constituents that have passed through the filters.

I have found that if cellulose acetate is extracted with certain liquids that are solvents for these constituents but are not solvents for the main portion of the cellulose acetate, a highly improved product is obtained.

In accordance with my invention I prepare cellulose acetate or other organic esters of cellulose of improved properties by extracting, for instance, an acetone soluble cellulose acetate with a solvent for the constituents that are not soluble in the solvent for the main bulk of the cellulose acetate. Example of such extracting liquids are chloroform, dichlorethylene ($C_2H_2Cl_2$) or other suitable chlorinated hydrocarbons.

The extraction with the chloroform or other extracting liquid may be performed in the cold or at elevated temperatures. Generally if only a small amount of the impurities are present, elevated temperatures may be employed to hasten the process. On the other hand when large amounts of the impurities are present, it is better to employ lower extracting temperatures, since at elevated temperatures the whole of the cellulose acetate is liable to gel and otherwise bind together and render the extraction process lengthy.

By way of illustration, the following is given. A cellulose acetate, the main constituent of which is soluble in acetone, having an acetyl value of about 54.5% determined as acetic acid, and forming a solution in acetone that has a clarity of 15 in certain arbitrary units is subjected to repeated extraction with warm chloroform. The chloroform dissolves the bulk of the constituents that are not soluble in acetone, and the amount extracted varies from 0.2 to 5% of the weight of the cellulose acetate treated. The purified cellulose acetate remaining after extraction forms a solution in acetone that has a clarity of over 40 in the same units.

Examination of the material that is dissolved by the chloroform indicates that it comprises cellulose acetates of higher acetyl value, say 57 to 60% acetyl value, than the bulk of the original cellulose acetate treated.

Cellulose acetate or other organic esters of cellulose, when purified by the process of my invention forms solutions of extremely high clarity in suitable solvents, which solutions are of somewhat lighter color than those produced from the untreated cellulose acetate. Solutions formed from the purified cellulose acetate do not become clouded nor do they lose their clarity on standing. Films, sheets and the like produced from such purified cellulose acetate are clearer than those produced from the untreated cellulose acetate. Solutions of the purified cellulose acetate filter with greater facility, and since they contain less filterable matter, such solutions do not choke the filter dressings so frequently, and thus require less plant for filtration and less frequent changing of filter dressings. Moreover solutions of such purified cellulose acetate spin with greater stability when extruded through fine orifices into evaporative atmospheres or into precipitating liquid baths.

Because of the improved properties, the cellulose acetate or other esters of cellulose treated by my process is eminently suited for making of films for photographic or other purposes, or clear sheets for laminated glass, etc., where high clarity is required. Its use for making of yarn or filaments is of great advantage. Another important application of this purified cellulose acetate is in the making of molding powder containing finely divided cellulose acetate and plastifier adapted to be molded under heat and pressure to required form.

It is to be understood that the foregoing detailed description is given merely by way of illustration, and that many variations may be made therein without departing from the spirit of my invention.

Having described my invention, what I claim and desire to secure by Letters Patent is:

1. Method of increasing the clarity of organic esters of cellulose, comprising extracting the acetone soluble organic ester of cellulose with a chlorinated hydrocarbon that is a non-solvent for the main bulk of the organic ester of cellulose.

2. Method of increasing the clarity of cellulose acetate comprising extracting the acetone soluble cellulose acetate with a chlorinated hydrocarbon that is a non-solvent for the main bulk of the cellulose acetate.

3. Method of increasing the clarity of acetone-soluble cellulose acetate, comprising extracting the cellulose acetate with a chlorinated hydrocarbon that is a solvent for those constituents that are not readily soluble in acetone.

4. Method of increasing the clarity of acetone-soluble cellulose acetate, comprising extracting the acetone-soluble cellulose acetate with chloroform.

5. Organic esters of cellulose purified by the extraction of the constituents that are not soluble in solvents for the main bulk of the organic esters of cellulose, said purified organic esters of cellulose having a clarity of about two and two-thirds times the clarity of the original organic esters of cellulose and being capable of forming solutions and compositions having this high degree of clarity.

6. An acetone-soluble cellulose acetate purified by the extraction with chloroform of the constituents that are not soluble in acetone, said purified cellulose acetate having a clarity of about two and two-thirds times the clarity of the original cellulose acetate and being capable of forming solutions and compositions having this high degree of clarity.

WILLIAM WHITEHEAD.